United States Patent
King et al.

(10) Patent No.: US 7,551,057 B2
(45) Date of Patent: Jun. 23, 2009

(54) REMOTE ENTRY SYSTEM WITH INCREASED TRANSMIT POWER AND REDUCED QUIESCENT CURRENT

(75) Inventors: Ronald O. King, Brownstone, MI (US); Neal Richard Manson, Southfield, MI (US); Steven Chang, Clinton Township, MI (US)

(73) Assignee: Lear Corporation, Southfield, MI (US)

( * ) Notice: Subject to any disclaimer, the term of this patent is extended or adjusted under 35 U.S.C. 154(b) by 782 days.

(21) Appl. No.: 11/266,933

(22) Filed: Nov. 4, 2005

(65) Prior Publication Data

US 2007/0103271 A1 May 10, 2007

(51) Int. Cl.
   *B60R 25/00* (2006.01)
(52) U.S. Cl. .............. 340/5.72; 340/426.13; 340/5.64; 340/442; 340/10.1; 340/825.69
(58) Field of Classification Search ............. 340/5.72, 340/426.13, 5.64, 442, 10.1, 825.69
   See application file for complete search history.

(56) References Cited

U.S. PATENT DOCUMENTS

| | | | |
|---|---|---|---|
| 5,376,975 A | 12/1994 | Romero et al. | |
| 5,974,056 A | 10/1999 | Wilson et al. | |
| 6,236,850 B1 | 5/2001 | Desai | |
| 6,462,648 B1 | 10/2002 | Stouffer et al. | |
| 6,724,322 B2 | 4/2004 | Tang et al. | |
| 6,885,282 B2 | 4/2005 | Desai et al. | |
| 2003/0085798 A1 | 5/2003 | Castro Esteban | |
| 2003/0122660 A1* | 7/2003 | Kachouh et al. | 340/442 |
| 2004/0218699 A1 | 11/2004 | Carsello | |
| 2005/0068153 A1 | 3/2005 | Lucy et al. | |

(Continued)

FOREIGN PATENT DOCUMENTS

DE    4015094 A1   11/1991

(Continued)

OTHER PUBLICATIONS

U.S. Appl. No. 10/960,657, filed Oct. 7, 2004, Remote Keyless Entry System With Two-Way Long Range Communication.

*Primary Examiner*—Brian A Zimmerman
*Assistant Examiner*—Omer S Khan
(74) *Attorney, Agent, or Firm*—MacMillan, Sobanski & Todd, LLC

(57) ABSTRACT

A remote entry system for a vehicle includes a portable transmitter and a vehicle-mounted receiver. The receiver alternates between a monitoring state lasting for a monitoring period and a sleep state lasting for a sleep period. A remote control is manually activated and a message sequence is transmitted to the receiver in response to the manual activation for initiating a function of the remote entry system. The message sequence comprises a plurality of blocks transmitted at a predetermined block interval, the blocks including a preamble block and at least one message block. If the receiver detects the preamble block then it enters a reception state for detecting the message block. The preamble block has a predetermined preamble length and is comprised of a plurality of bytes separated by respective off intervals between successive bytes. Each off interval comprises a predetermined off period greater than the predetermined byte period. The predetermined off period is less than the monitoring period and the monitoring period is less than or equal to the predetermined off period plus substantially twice the predetermined byte period.

10 Claims, 2 Drawing Sheets

U.S. PATENT DOCUMENTS

2005/0104715 A1 * 5/2005 Farrell ..................... 340/5.64

FOREIGN PATENT DOCUMENTS

| DE | 19524689 | C1 | 11/1996 |
| DE | 10240137 | A1 | 3/2004 |
| DE | 10223219 | A1 | 6/2008 |
| GB | 2331389 | | 5/1999 |

* cited by examiner

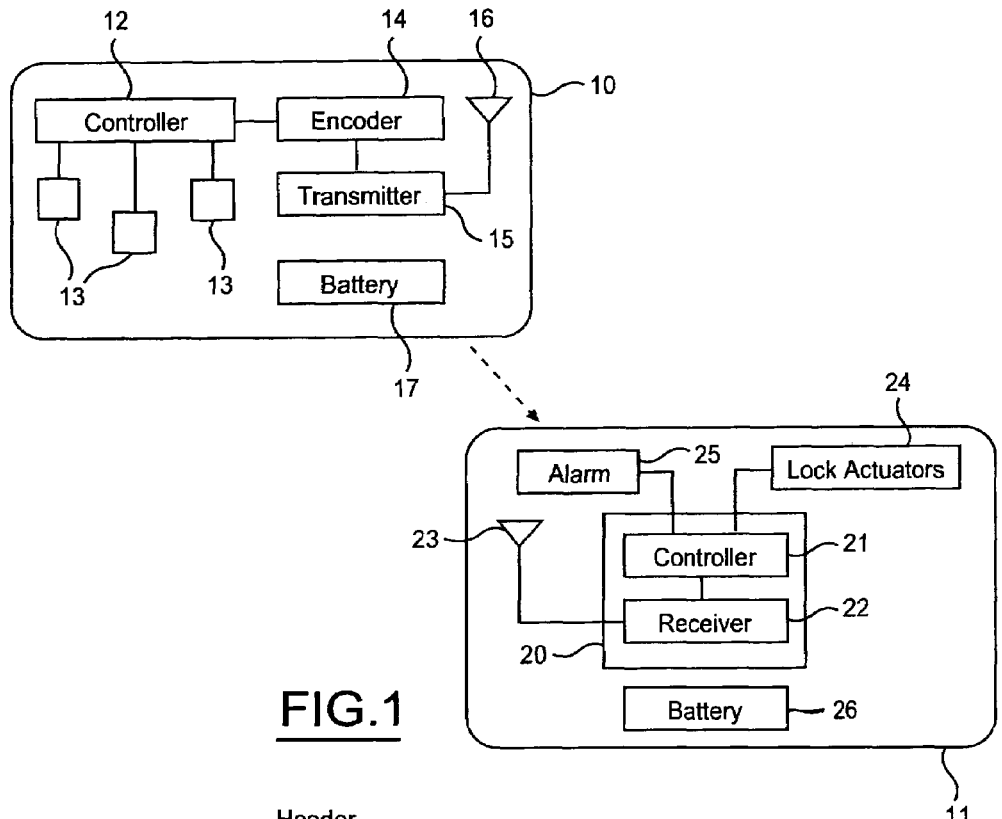
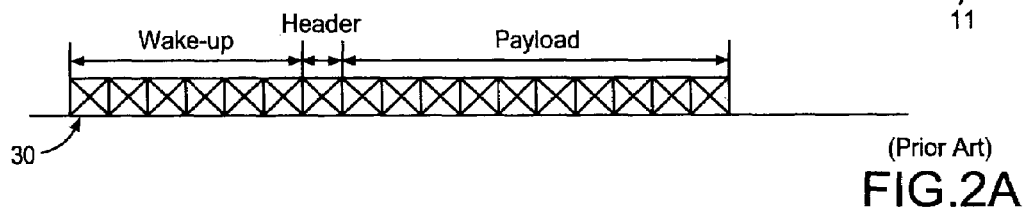
FIG.1
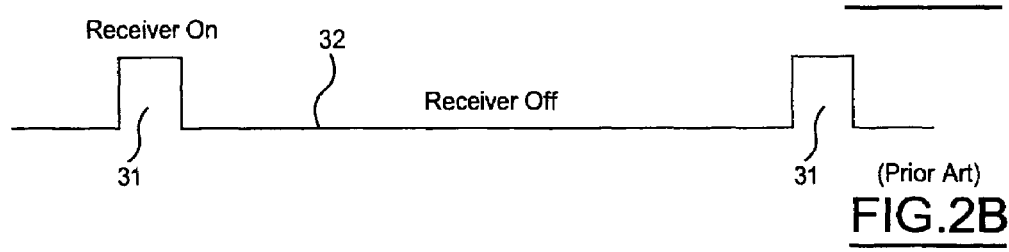
(Prior Art)
FIG.2A
(Prior Art)
FIG.2B
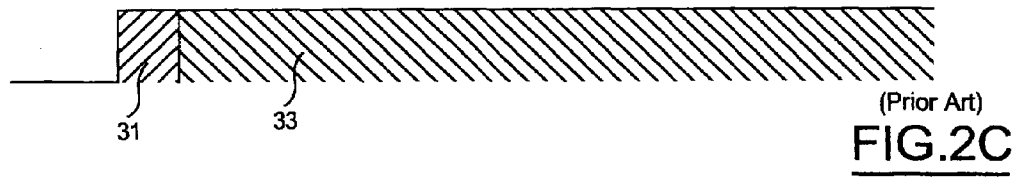
(Prior Art)
FIG.2C

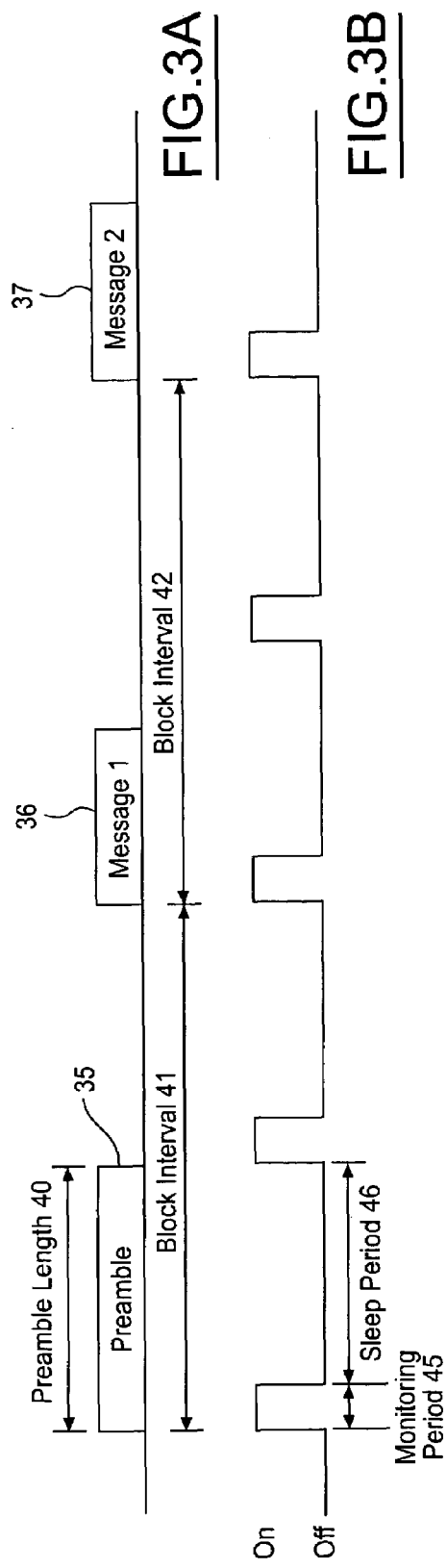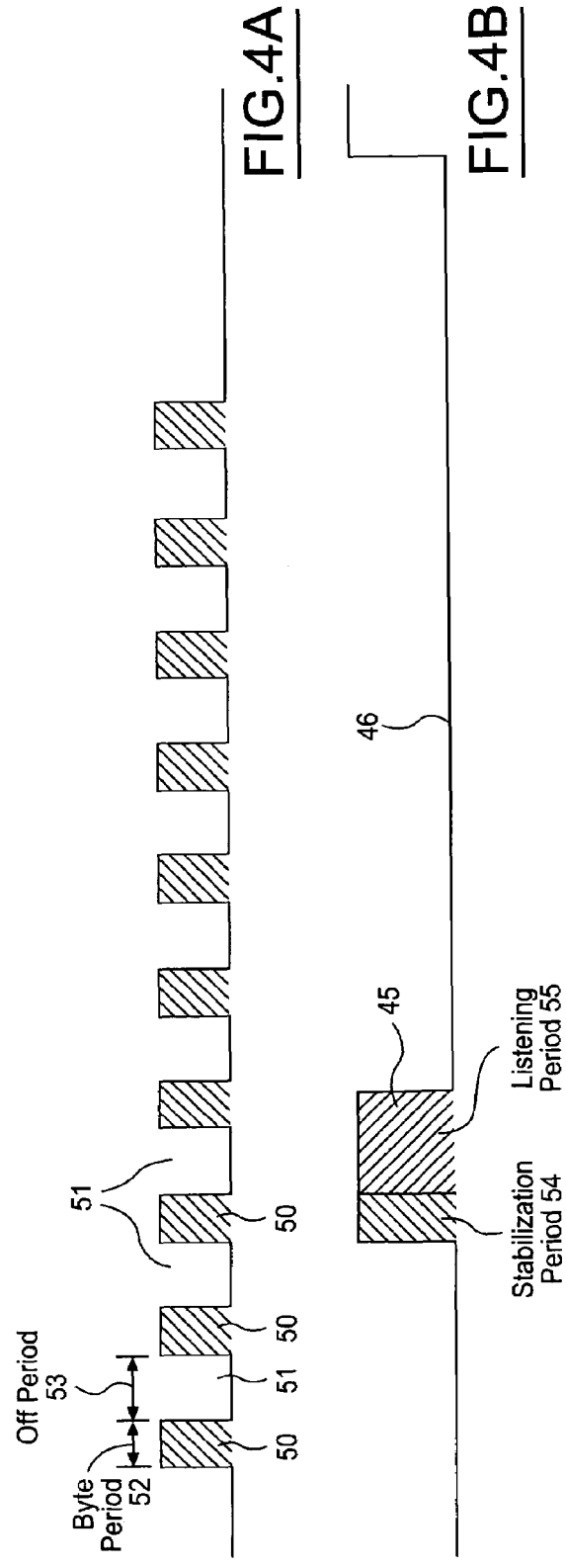

REMOTE ENTRY SYSTEM WITH INCREASED TRANSMIT POWER AND REDUCED QUIESCENT CURRENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to remote keyless entry systems for motor vehicles, and, more specifically, to reducing quiescent current draw in the vehicle-mounted receiver while providing for an increased transmission range between a handheld portable transmitter fob and the vehicle-mounted receiver.

Remote keyless entry (RKE) systems for use with motor vehicles are well known in the art. Such systems typically include at least one remote control device, which typically takes the form of a key fob having a radio frequency (RF) transmitter and several push buttons for manually initiating a desired remote entry function. A receiver and controller are typically provided in the vehicle for receiving the RF signals and controlling one or more vehicle devices in order to effect the desired vehicle function. In-vehicle devices which have been remotely controlled in such a fashion include door lock mechanisms, a vehicle trunk, interior and/or exterior vehicle lights, and a vehicle horn or other alarm.

A key fob must be small in size in order to facilitate carrying in a user's pocket or purse. Thus, miniaturized circuits and a small battery size are employed. Energy efficient microelectronic circuits and methods of operation are necessary in order to minimize battery consumption and maximize battery life. The key fob must also accommodate a transmit/receive antenna that is preferably hidden within the key fob because of esthetic and durability concerns. Therefore, the antenna gain that can normally be achieved is fairly low. The low antenna gain has constrained the operating range over which broadcasts between the portable fob and the vehicle receiver can be reliably received.

The vehicle-mounted receiver typically operates only when the vehicle engine is not running. The receiver draws its power from the vehicle battery which is not then being recharged by the vehicle alternator. Therefore, it is desired that the current draw of the receiver be very low so that the battery charge is not depleted too quickly. A typical specification for a vehicle-mounted receiver may be that average quiescent current (i.e., as it idles in a reduced-power mode with only circuits necessary to detect the presence of an incoming signal being operable) is less than about 2 mA. Even with efficient circuit design techniques, a typical receiver may draw about 10 mA while monitoring for an incoming signal. To reduce average current to an acceptable level, the receiver is operated intermittently. As long as the receiver is turned on once during the length of time of an incoming signal then the receiver can detect that a signal is present and can wake-up completely for processing a message. The receiver can be put in a sleep mode drawing only a few hundred microamps for most of the time. To facilitate the intermittent operation of the receiver, the transmitter may retransmit the message signal multiple time in quick succession. Alternatively, a message preamble normally included at the beginning of an incoming signal may be provided with a sufficient duration to ensure that it awakens the receiver. Longer transmissions, however, reduce the lifetime of the battery contained in the portable transmitter.

Another important characteristic of an RKE system is the distance within which the user must come to the vehicle in order to transmit a signal that is receivable at the vehicle. One method to increase effective range would be to increase the transmitter power. However, government regulations aimed at reducing the likelihood of interference with other transmissions are in place which limit the allowed transmitter power. As disclosed in copending U.S. application Ser. No. 10/960, 657, filed Oct. 7, 2004, entitled "Remote Keyless Entry System With Two-Way Long Range Communication," the peak transmission power (and thereby the range) can be maximized by using time-spaced message packets so that a higher peak power is averaged over a longer message time so that the average transmission power stays within the limit of the government regulations. However, when the transmitter is turned on for shorter periods of time, the length of time that the receiver can be in sleep mode is correspondingly shorter. The shorter sleep period results in an undesirable increase in the quiescent current of the receiver.

SUMMARY OF THE INVENTION

The present invention has the advantage of utilizing maximum peak transmission power for a preamble for waking a vehicle-mounted receiver while obtaining a low quiescent current for the receiver by maintaining a relatively long sleep state.

In one aspect of the invention, a method is provided for operating a remote entry system for a vehicle, the remote entry system including a portable transmitter and a vehicle-mounted receiver. The receiver alternates between a monitoring state lasting for a monitoring period and a sleep state lasting for a sleep period, wherein the monitoring period and the sleep period together comprises a cycle period. A remote control is manually activated. A message sequence is transmitted to the receiver in response to the manual activation for initiating a function of the remote entry system. The message sequence comprises a plurality of blocks transmitted at a predetermined block interval, the blocks including a preamble block and at least one message block. If the receiver detects the preamble block then it enters a reception state for detecting the message block. The preamble block has a predetermined preamble length and is comprised of a plurality of bytes separated by respective off intervals between successive bytes. Each byte comprises a predetermined byte period. Each off interval comprises a predetermined off period greater than the predetermined byte period. The predetermined off period is less than the monitoring period and the monitoring period is less than or equal to the predetermined off period plus substantially twice the predetermined byte period.

BRIEF DESCRIPTION OF THE DRAWINGS

FIG. 1 is a block diagram showing a portable transmitter key fob and a vehicle-mounted receiver as used in the present invention.

FIGS. 2A, 2B, and 2C are timing diagrams corresponding to a prior art message protocol.

FIGS. 3A and 3B are timing diagram corresponding to a preferred embodiment of the present invention.

FIGS. 4A and 4B show a preamble from the transmitter and a monitoring state of the receiver in greater detail.

DETAILED DESCRIPTION OF PREFERRED EMBODIMENTS

Referring to FIG. 1, a portable fob transmitter 10 transmits RF signals in the vicinity of a vehicle 11 containing an RKE module 20. Transmitter 10 includes a microcontroller 12 coupled to a plurality of push buttons 13, each corresponding to a respective remote function such as unlocking doors, locking doors, or sounding a panic alarm. In response to manual activation of a push button 13, controller 12 determines a corresponding message sequence which is provided to an encoder 14 (such as a Manchester encoder, PWM, di-phase, or any other suitable encoding techniques). Encoded data is provided to a transmitter circuit 15 that drives an antenna 16 to wirelessly broadcast the message sequence to RKE module 20. A battery 17 provides all the electrical power for the fob components.

RKE module 20 includes a controller 21 and a receiver 22 connected to an antenna 23. Receiver 22 has a full-powered state and a low-power sleep state which are alternately selected by controller 21 according to a predetermined cycle period adapted to ensure that at least a portion of any incoming fob transmission will be detected. After receiving a complete message, controller 21 performs a validation of the signal based on the ID code and initiates a corresponding RKE function if from a valid (i.e., authorized) transmitter. Controller 21 is connected to vehicle lock actuators 24 and an alarm 25 (such as a horn) for performing corresponding RKE functions, as known in the art. A vehicle battery 26 supplies power to RKE module 20 according to an operating current when receiver 22 is active and a quiescent current when receiver 22 is in a sleep state.

The data contained in a typical message sent by an RKE fob to the vehicle receiver includes a transmitter identifier and an operation code. The transmitter identifier may comprise an encrypted identification code generated using a rolling code algorithm, as is known in the art, to prevent interception and subsequent unauthorized access to a vehicle. The operation code identifies a desired vehicle function as determined by the particular push button pressed on the fob, such as unlocking the doors. The data is typically encoded in a return to zero signal pattern, such as Manchester encoding. A message protocol is utilized which typically defines a preamble or wake-up tone (to allow the receiver to detect an incoming message and synchronize its clock), a start bit or header, and a data field or payload having a prescribed number of bits. When the push button is held down on a conventional RKE fob, the corresponding data message is broadcast as one continuous signal (which may be repeated several times within about a second in order to ensure that the receiver gets a complete transmission after it wakes up and for redundancy in the event there are interfering signals present.

RKE transmitters are regulated as intentional radiators. Most existing RKE systems operate at 315 MHz or at 433 MHz. Each particular transmitter design is certified, so that individual licenses are not necessary for their operation. In the United States, for example, the FCC regulates these remote control devices by imposing a field strength limitation for the fundamental frequency at 315 MHz of 6,040 microvolts per meter measured at 3 meters. Compliance with the limits on field strength may be demonstrated based on the average value of the measured emissions. Therefore, a peak signal strength greater than the specified field strength limit is permissible provided the average emissions are within the specified limit. The regulations providing for the field strength limitation are found in FCC regulations under Title 47, Part 15, Section 15.231. FCC rules further provide in Section 15.35 that when an average radiated emission limit is specified there is also a limit on peak emissions corresponding to 20 dB above the maximum permitted average limit. In view of the further requirement that the average be determined over an interval no greater than 0.1 seconds, emission at the peak value 20 dB above the average limit can be conducted for only 10 milliSeconds (mS) during any 100 mS interval. In order to catch a 10 mS transmission, the vehicle receiver has to be active for some portion of every 10 mS interval. Since each monitoring interval requires a certain amount of time for the receiver to stabilize and for a certain number of transmitted bits to be received for reliably detecting the presence of a transmission, the sleep period for the vehicle receiver would be very short and quiescent current would be high.

FIG. 2A shows a conventional fob transmission signal 30 including a wake-up preamble portion, a header portion, and a payload or data portion. FIG. 2B shows the cycling of the vehicle-mounted receiver between a monitoring state 31 and an off state 32. The cycle period for the switching on of the receiver must be less than or equal to the duration of the wake-up portion (for a fob that only transmits the signal once) or less than or equal to the duration of the entire signal 30 (for a fob that retransmits the signal). As shown in FIG. 2C, if the receiver detects a transmission signal during monitoring state 31 then it enters a reception state 33 by remaining on until a transmission has been fully received (or until a time out occurs).

For a typical prior art transmission using Manchester coding, the total transmitter on time may be about 30 mS during any 100 mS window. The duty cycle for determining an average signal strength is equal to about 20·log(30 mS/100 mS) or about 10.5 dB. Consequently, the prior art transmission could utilize peak field strength which was about 10 dB greater than the average field strength limit, but no higher.

Copending U.S. application Ser. No. 10/960,657 teaches a modified message protocol for optimizing transmissions to utilize peak field strength that takes full advantage of the allowable peak values above the specified average. By reducing the transmitter on time to 10 mS during a 100 mS window, the duty cycle reduces to 20 dB so that the peak signal strength can be 20 dB above the regulated limit. In order to detect a shorter duration transmission, however, the sleep time of the vehicle receiver has to be reduced thereby increasing the quiescent current.

One preferred embodiment of the present invention for keeping the transmitter on time at 10 mS while increasing the sleep time of the receiver is shown in FIGS. 3 and 4. By separating the preamble from the data portions of the transmission and by inserting extra transmitter off time between bytes in the preamble, the competing desires for a short transmitter on time and a long preamble are accommodated.

As shown in FIG. 3A, a message sequence is transmitted from the portable fob transmitter to the vehicle receiver as a plurality of separate blocks including preamble 35 and data blocks 36 and 37. Data block 37 is only needed for redundancy or in the event that more data is being transmitted than can be contained in one block. Preamble 35 has a preamble length 40. The blocks are transmitted at a block interval 41 which is preferably about 100 mS. In a preferred embodiment, preamble length 40 may be about 50 mS. FIG. 3B shows the alternating states of the vehicle receiver. The receiver is turned on during a monitoring period 45 and off during a sleep period 46. The cycle period from one monitoring period to the next is less than or equal to preamble length 40 (e.g., about 50 mS in a preferred embodiment).

Preamble 35 is shown in greater detail in FIG. 4A. A plurality of preamble bytes 50 are transmitted each having a byte period 52. Each byte may be comprised of 8 bits with each bit having a value of zero, although any other byte or bit patterns can be used. The bytes are separated by respective off intervals 51 each having an off period 53 during which the signal strength drops to zero. Preferably, off period 53 is greater than byte period 52, although any off period greater than about 1 mS can be used. In one preferred embodiment, byte period 52 may be about 2 mS and off period 53 may be about 3 mS, for example. Off period 53 must be less than monitoring period 45 so that preamble detection is not impaired. The sum of all the byte periods is less than or equal to 20% of block interval 41 so that a signal strength 20 dB above the regulated average limit can be maintained (20% rather than 10% because with Manchester encoding the transmitter is off during half of each byte period).

FIG. 4B shows monitoring period 45 in greater detail. After activating power to the receiver, a stabilization period 54 occurs before the receiver can actually detect any incoming RF signal. A typical stabilization period is equal to about 1 mS. Thereafter, a listening period 55 is provided having a minimum length corresponding to the minimum number of designated bits that must be received in order to make a judgment that a preamble is being received. A typical receiver may require about 7 bits to be detected, for example. In order to ensure preamble detection, listening period 55 must be long enough to capture the predetermined number of bits. It is not necessary that all the bits be from the same byte. Thus, listening period 45 should be greater than or equal to off period 53 plus a time associated with transmitting the predetermined number of bits.

In general, the length of monitoring period 45 is less than or equal to the length of off period 53 plus about two times the length of byte period 52. Due to the presence of off intervals 51, monitoring period 45 may be slightly longer than under the prior art. However, sleep period 46 is lengthened proportionally more than monitoring period 45 because the multiple occurrences of off period 53 increase the preamble length to a greater degree. Consequently, the duty cycle (ratio of on time to off time) of the receiver and the average quiescent current of the RKE module are greatly reduced.

What is claimed is:

1. A method of operating a remote entry system for a vehicle, said remote entry system including a portable transmitter and a vehicle-mounted receiver, said method comprising the steps of: alternating said receiver between a monitoring state lasting for a monitoring period and a sleep state lasting for a sleep period, said monitoring period and said sleep period together comprising a cycle period; manually activating said remote control; and transmitting a message sequence to said receiver in response to said manual activation for initiating a function of said remote entry system, said message sequence comprising a plurality of blocks transmitted at a predetermined block interval, said blocks including a preamble block and at least one message block, wherein if said receiver detects said preamble block then it enters a reception state for detecting said message block; wherein said preamble block has a predetermined preamble length and is comprised of a plurality of bytes separated by respective off intervals between successive bytes, wherein each byte comprises a predetermined byte period, wherein each off interval comprises a predetermined off period greater than said predetermined byte period, wherein said predetermined off period is less than said monitoring period, and wherein said monitoring period is less than or equal to said predetermined off period plus twice said predetermined byte period.

2. The method of claim 1 wherein said cycle period is equal to said predetermined preamble length.

3. The method of claim 1 wherein a sum of all of said byte periods is less than or approximately equal to twenty percent of said predetermined block interval.

4. The method of claim 3 wherein said bytes of said preamble block are transmitted using Manchester encoding.

5. The method of claim 1 wherein said monitoring period of said receiver comprises a stabilization period and a listening period, wherein said receiver detects said preamble block in response to decoding a predetermined number of bits from said plurality of bytes, and wherein said listening period is greater than or equal to said predetermined off period plus a time associated with said predetermined number of bits.

6. Apparatus for operating a remote entry system of a vehicle comprising: a receiver for mounting in said vehicle and alternating between a monitoring state lasting for a monitoring period and a sleep state lasting for a sleep period, said monitoring period and said sleep period together comprising a cycle period; and a remote control transmitter for transmitting a message sequence to said receiver in response to a manual activation identifying a desired function of said remote entry system, said message sequence comprising a plurality of blocks transmitted at predetermined block interval, said blocks including a preamble block and at least one message block, wherein if said receiver detects said preamble block then it enters a reception state for detecting said message block; wherein said preamble block has a predetermined preamble length and is comprised of a plurality of bytes separated by respective off intervals between successive bytes, wherein each byte comprises a predetermined byte period, wherein each off interval comprises a predetermined off period greater than said predetermined byte period, wherein said predetermined off period is less than said monitoring period, and wherein said monitoring period is less than or equal to said predetermined off period plus twice said predetermined byte period.

7. The apparatus of claim 6 wherein said cycle period is equal to said predetermined preamble length.

8. The apparatus of claim 6 wherein a sum of all of said byte periods is less than or approximately equal to twenty percent of said predetermined block interval.

9. The apparatus of claim 8 wherein said bytes of said preamble block are transmitted using Manchester encoding.

10. The apparatus of claim 6 wherein said monitoring period of said receiver comprises a stabilization period and a listening period, wherein said receiver detects said preamble block in response to decoding a predetermined number of bits from said plurality of bytes, and wherein said listening period is greater than or equal to said predetermined off period plus a time associated with said predetermined number of bits.

* * * * *